(12) United States Patent
Ono et al.

(10) Patent No.: US 6,816,222 B2
(45) Date of Patent: Nov. 9, 2004

(54) LIQUID CRYSTAL DISPLAY DEVICE

(75) Inventors: Kikuo Ono, Mobara (JP); Takahiro Ochiai, Mobara (JP); Ryutaro Oke, Mobara (JP); Yoshiaki Nakayoshi, Ooami (JP); Nagatoshi Kurahashi, Mobara (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 10/051,185

(22) Filed: Jan. 22, 2002

(65) Prior Publication Data

US 2002/0101557 A1 Aug. 1, 2002

(30) Foreign Application Priority Data

Jan. 29, 2001 (JP) ........................................ 2001-019386

(51) Int. Cl.$^7$ .............................................. G02F 1/1343
(52) U.S. Cl. ........................ 349/143; 349/139; 349/106; 349/110
(58) Field of Search ................................ 349/111, 141, 349/110, 143, 139, 106

(56) References Cited

U.S. PATENT DOCUMENTS

| | | | | | |
|---|---|---|---|---|---|
| 5,781,261 A | * | 7/1998 | Ohta et al. | ................. | 349/111 |
| 5,850,271 A | * | 12/1998 | Kim et al. | ................. | 349/111 |
| 6,271,902 B1 | * | 8/2001 | Ogura et al. | ................. | 349/106 |
| 6,330,043 B1 | * | 12/2001 | Kikkawa et al. | ............... | 349/43 |
| 6,414,732 B1 | * | 7/2002 | Matsumoto et al. | ........ | 349/106 |
| 6,417,898 B1 | * | 7/2002 | Izumi | ........................... | 349/73 |
| 6,445,432 B2 | * | 9/2002 | Yamamoto et al. | ......... | 349/106 |
| 6,466,281 B1 | * | 10/2002 | Huang et al. | ................ | 349/44 |

FOREIGN PATENT DOCUMENTS

GB          2344683          12/1999

OTHER PUBLICATIONS

US 2002/0024627 A1, Sakamoto et al., Feb. 28, 2002.*

* cited by examiner

Primary Examiner—Tarifur R. Chowdhury
Assistant Examiner—Thoi V. Duong
(74) Attorney, Agent, or Firm—Reed Smith LLP; Stanley P. Fisher, Esq.; Juan Carlos A. Marquez, Esq.

(57) ABSTRACT

In a TFT type liquid crystal display device comprising first and second transparent substrates and a liquid crystal layer which is sandwiched between the first and second substrates, the first substrate includes a plurality of video signal lines, a plurality of scanning signal lines and a plurality of pixel regions which are formed as regions surrounded by the video signal lines and the scanning signal lines, each pixel region includes at least one active element, one pixel electrode and one common electrode, and color filter layers are formed between the pixel electrodes and the liquid crystal layer. The liquid crystal display device is substantially characterized in that the common electrodes are formed as layers above the color filters, the pixel electrodes are formed as layers below the color filters, and the color filters are superposed at least on the whole surfaces of the pixel electrodes in the pixel region.

8 Claims, 7 Drawing Sheets

LIQUID CRYSTAL DISPLAY DEVICE

BACKGROUND OF THE INVENTION

1. Field of the Invention

The present invention relates to a liquid crystal display device and a manufacturing method thereof.

2. Description of the Related Art

An example of a basic constitution of a liquid crystal display device which uses thin film transistors (also referred to as "TFTs" in this specification) as driving elements is constituted as follows. TFTs, scanning lines or signal lines are formed on a first transparent substrate, color filters are formed on a second transparent substrate, and liquid crystal is inserted into a gap between the first and second transparent substrates while arranging a TFT forming surface or a color filter forming surface at the inside of the respective substrates. The TFTs on the first substrate are arranged on respective pixel regions. Further, with respect to color filters on the second substrate, color regions consisting of red (R), green (G), blue (B) are arranged in a stripe shape and a black matrix constitution made of metal is adopted as partitions for color filters (also referred to as "CFs" in this specification) of respective colors CF. The brightness, that is, the numerical aperture of the liquid crystal display device having such a constitution is largely reduced when the positioning accuracy of the first and second substrates is poor and this adverse influence is worse than the positioning accuracy among the TFTS, the scanning lines and the signal lines on the first substrate. Accordingly, there has been publicly proposed a technique which is generally called "a color-filter on TFTs". This technique is characterized by simultaneously forming color filters and a black matrix which have been formed on the second substrate conventionally along with the formation of the TFTs, the scanning lines, the signal lines or the like on the first substrate.

On the other hand, as a system which broadens a viewing angle of the liquid crystal display device, there have been proposed an IPS (In-Plane-Switching) type and a FSS (Fringe-Field-Switching) type. In the IPS type, by rotating liquid crystal molecules substantially horizontally with respect to substrates, pixel electrodes and common electrodes for driving liquid crystal are simultaneously formed on the first substrate and an electric field is generated substantially horizontally with respect to the substrates by applying a voltage between two electrodes. In the FSS type, either one of the pixel electrodes and the common electrodes are formed in a planar shape without forming them in a comb-like shape and comb-like electrodes are formed on the electrodes by way of an insulation film. The FSS type is disclosed in Japanese Laid-open Patent Publication 202356/1999.

Further, a method which realizes a color filter/on/TFT using the IPS type is disclosed in Japanese Laid-open Patent Publication 111957/2000.

SUMMARY OF THE INVENTION

However, in Japanese Laid-open Patent Publication 111957/2000, pixel electrodes which apply an electric field to a liquid crystal layer are arranged on an upper portion of a color filter layer via through holes formed in the color filter layer. The through hole is formed for each pixel. However, inventors of the present invention have found a serious problem with respect to the mass-productiveness or the yield factor that the clogging of these through holes gives rise to the large reduction of the yield factor according to a result of an experiment. Further, in the IPS display type, the dielectric constant is low and due to the voltage dividing effect brought about by the color filter layer whose thickness is greater than a film thickness of an inorganic insulation film on the TFT. Accordingly, when the through holes are not formed as described in Japanese Laid-open Patent Publication 111957/2000, it is impossible to apply a sufficient voltage to the liquid crystal layer so that there arises a problem that the transmittivity is lowered.

Further, Japanese Laid-open Patent Publication 202356/1999 discloses a constitution in which, to rotate liquid crystal molecules horizontally with respect to the first substrate, common electrodes which are not formed in a comb shape are formed on the first substrate and pixel electrodes formed in a comb shape are formed on the common electrodes by way of an insulation film. However, color filters are not formed on the first substrate and there is no technical disclosure including problems related with the color- filter-on TFTs. On the other hand, Japanese Laid-open Patent Publication 111957/2000 discloses one system of the color-filter-on TFTs which use the IPS type. The system, in a cross-sectional structure thereof, while adopting a constitution in which a transparent insulation is provided between pixel electrodes and common electrodes as a basic constitution, forms resin-made color layers which constitute color filter layers into given thickness of red (R), green (G) and blue (B) depending on the color arrangement of respective pixel and are patterned. Accordingly, after forming the usual TFTs, the color filter CF layers R, G, B are formed through the photo-patterning three times. Then, comb electrodes which constitute either one of the pixel electrodes and the common electrodes are formed and then, a transparent insulation film is formed. Further, comb electrodes which constitute the other one of the pixel electrodes and the common electrodes are formed. In this manner, there has been a problem that the steps are extremely long. Further, such lengthy steps increases chances of positioning of exposure on the first substrate on which the TFTs are formed. Accordingly, when the manufacturing steps are performed while ensuring the margin for positioning, there arises a problem that the original purpose of the color-filter-on TFTs to provide a bright liquid crystal display device by increasing the numerical aperture and the transmittivity is not achieved.

Accordingly, it is an object of the present invention to solve the above-mentioned problems and it is an first object of the present invention to provide a TFT liquid crystal display device which arranges pixel electrodes and common electrodes which drive a liquid crystal layer on a first glass substrate and also incorporates color filter layers therein without forming through holes for respective pixels.

Further, it is a second object of the present invention to provide a liquid crystal display device which forms not only TFTs but also CFs on a first substrate at the time of forming the liquid crystal display device having a broad viewing angle by horizontally rotating liquid crystal molecules with respect to substrates using a simplified manufacturing method and a method for manufacturing such a liquid crystal display device.

Further, it is a third object of the present invention to provide a liquid crystal display device which exhibits the high numerical aperture and the high transmittivity and a method for manufacturing the liquid crystal display device.

Further objects of the present invention will be apparent from the description of this specification.

To briefly explain typical means for solving the above-mentioned problems, they are as follows.

(Means 1)

In a liquid crystal display device which includes first and second transparent substrates and a liquid crystal layer which is sandwiched between the first and second substrates, wherein the first substrate includes a plurality of video signal lines, a plurality of scanning signal lines and a plurality of pixel regions which are formed as regions surrounded by the video signal lines and the scanning signal lines, each pixel region includes at least one active element and one pixel electrode, and color filter layers are formed between the pixel electrodes and the liquid crystal layer, a boundary between color filters of pixels which are arranged close to each other in the extending direction of the scanning signal lines is positioned on the video signal line and, at the same time, a light shielding layer is formed between the color filters and the liquid crystal layer such that the light shielding layer is superposed on the boundary portion and the video signal line.

Due to such a constitution, the manufacturing steps can be shortened. Further, by forming the boundary of the color filter on the video signal line and by forming the light shielding layer which shields light made incident on the boundary region, a liquid crystal display device which can reduce the margin for positioning and can enhance the numerical aperture can be realized.

(Means 2)

In a liquid crystal display device which includes first and second transparent substrates and a liquid crystal layer which is sandwiched between the first and second substrates, wherein the first substrate includes a plurality of video signal lines, a plurality of scanning signal lines and a plurality of pixel regions which are formed as regions surrounded by the video signal lines and the scanning signal lines, each pixel region includes at least one active element, one pixel electrode and one common electrode, and color filter layers are formed between the pixel electrodes and the liquid crystal layer, the common electrodes are formed as layers above the color filters and the pixel electrodes are formed as layers below the color filters, and the color filters are formed to be superposed on at least the entire surfaces of the pixel electrodes in the pixel regions.

Due to such a constitution, it becomes possible to provide a TFT liquid crystal display device which arranges the pixel electrodes and the common electrodes which drive the liquid crystal layer on the first glass substrate and also incorporates the color filter layers without forming a through hole for each pixel.

(Means 3)

In a liquid crystal display device which includes first and second transparent substrates and a liquid crystal layer which is sandwiched between the first and second substrates, wherein the first substrate includes a plurality of video signal lines, a plurality of scanning signal lines and a plurality of pixel regions which are formed as regions surrounded by the video signal lines and the scanning signal lines, each pixel region includes at least one active element, one pixel electrode and one common electrode, and color filter layers are formed between the pixel electrodes and the liquid crystal layer, the common electrodes and the pixel electrodes are formed as layers below the color filters and the color filters are formed to be superposed on at least the entire surfaces of the pixel electrodes and of the common electrodes in the pixel regions.

Also according to such means, in the same manner as means 2, it becomes possible to provide a TFT liquid crystal display device which arranges the pixel electrodes and the common electrodes which drive the liquid crystal layer on the first glass substrate and also incorporates the color filter layers thereon without forming a through hole for each pixel.

(Means 4)

In a liquid crystal display device which includes first and second transparent substrates and a liquid crystal layer which is sandwiched between the first and second substrates, wherein common electrodes are provided to at least one of the first and second substrates, the first substrate includes a plurality of video signal lines, a plurality of scanning signal lines and a plurality of pixel regions which are formed as regions surrounded by the video signal lines and the scanning signal lines, each pixel region includes at least one active element and one pixel electrode, and color filter layers are formed between the pixel electrodes and the liquid crystal layer, the color filters are formed between the pixel electrodes and the common electrodes, and a driving electrode for the liquid crystal layer is generated along a path which passes both of the liquid crystal layer and the color filter between the pixel electrode and the common electrode.

Due to such an arrangement, the driving electric field can be applied to the liquid crystal layer which is sandwiched between the color filter layers and the second substrate without forming a through hole in the color filter layer of each pixel. Since the through holes are not formed in the color filter layers, the positioning accuracy between respective layers can be enhanced so that the numerical aperture can be enhanced and the bright TFT liquid crystal display device can be realized.

To explain examples of the means of the present invention, they are as follows.

To apply a larger electric field to the liquid crystal layer, the pixels or the common electrodes which are formed in the color filter layers are formed in a planar comb shape, the common electrodes or the pixel electrodes which are arranged below the color filters are formed in a rectangular shape, ends portions of at least the above-mentioned comb electrodes are superposed on rectangular electrodes which are disposed below the comb electrodes, and the intensity of electric field between the common electrodes and the pixel electrodes is determined by the film thickness of an insulation film which is sandwiched between the above-mentioned common electrode and pixel electrode. Further, the pixel electrodes or the common electrodes are formed in a planar comb shape, the common electrodes or pixel electrodes which are arranged below the color filters are formed in a rectangular shape, ends portions of at least the above-mentioned comb electrodes are superposed on rectangular electrodes which are disposed below the comb electrodes, and the intensity of electric field between the common electrodes and the pixel electrodes is determined by the film thickness of an insulation film which is sandwiched between the above-mentioned common electrode and pixel electrode, and the color filter layers are formed above the comb electrodes.

In a liquid crystal display device which can achieve other object of the present invention, the color filter layers are superposed on at least two or more layers to give a function of light shielding films for TFTs to the color filter layers thus simplifying the manufacturing steps.

In a liquid crystal display device which can achieve other object of the present invention, the color filter layers are separated along the neighboring drain lines such that the color filter layers are not superposed with each other, or the color filter layers are separated for respective pixels. Accordingly, the color filter having high transmittivity can be used and, at the same time, the color filter layers per se can be used as electrodes whereby it becomes possible to provide a bright TFT liquid crystal display device which can lower a driving voltage.

Further, to explain means to provide a bright TFT liquid crystal display device, they are as follows.

In a liquid crystal display device which includes first and second transparent substrates and a liquid crystal layer which is sandwiched between the first and second substrates, wherein the first substrate includes a plurality of video signal lines, a plurality of scanning signal lines and pixel regions which are formed as regions surrounded by the neighboring respective lines consisting of the video signal lines and the scanning signal lines, and each pixel region includes at least one active element and one pixel electrode, light shielding layers and the common electrodes are formed on the video signal lines by lamination by way of an insulation film, the light shielding layers are made of metal, and the common electrodes are made of a transparent conductive body.

Portions of the common electrodes which may preferably be disposed above the video signal lines have a width wider than that of the light shielding layers.

The common electrodes may preferably be laminated to upper layers of the light shielding layers.

The common electrodes may preferably be laminated to lower layers of the light shielding layers.

The common electrodes may preferably be superposed on the light shielding layers above the video signal lines and the common electrodes are not superposed on the light shielding layers at the display regions between the video signal lines.

The pixel electrodes may preferably be comb-shaped.

The pixel electrodes may preferably be comb-shaped and formed below the insulation films.

The insulation films may preferably be formed of color filters and are positioned along the video signal lines so as to define boundary portions.

The insulation films may preferably be formed of organic films.

The light shielding layers may preferably be also formed on the scanning signal lines.

Further means and effects of the present invention will become apparent from this specification including claims.

DESCRIPTION OF THE PREFERRED EMBODIMENTS

Preferred embodiments of the present invention are explained in detail in conjunction with drawings which show such embodiments hereinafter. In the following embodiments, although a semiconductor film is represented by an amorphous silicon (a-Si) and a transparent conductive film is represented by ITO, these films may be formed of polycrystalline silicon or macro-crystal silicon or single-crystal silicon. Further, these films may be formed of other transparent conductive film such as a film which is made of Indium Zinc Oxide (IZO), $InO_2$, $SnO_2$, ZnO or a mixture thereof or conductive oxide including In. Further, As names of the lines for TFTS, scanning lines are referred to as gate lines and video signal lines are referred to as drain lines. Further, with respect to source electrodes and drain electrodes of TFTs, electrodes at portions of TFTs which are connected to the drain lines side are referred to as the drain electrodes and pixel electrode sides which sandwich the channel length regions of TFTs with the pixel electrodes are referred to as the source electrodes.

[Embodiment 1]

Figure 1:
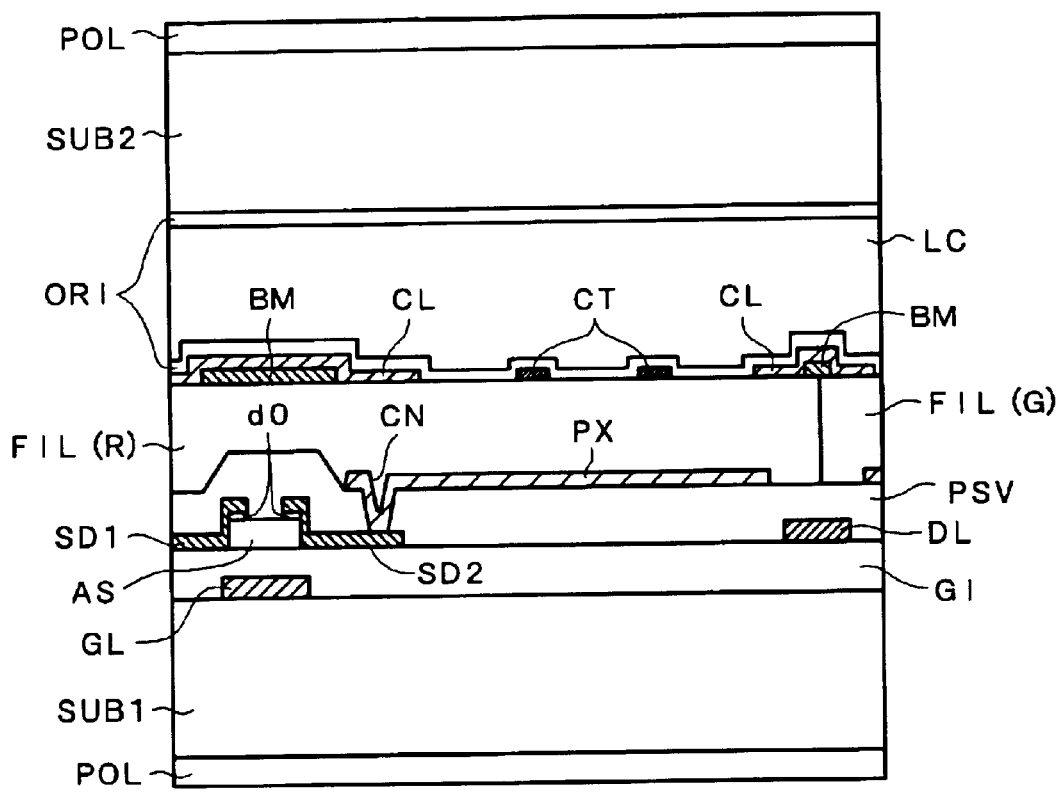
FIG. 1 is a cross-sectional view of a pixel of one embodiment of a liquid crystal display device according to the present invention.
Figure 2:
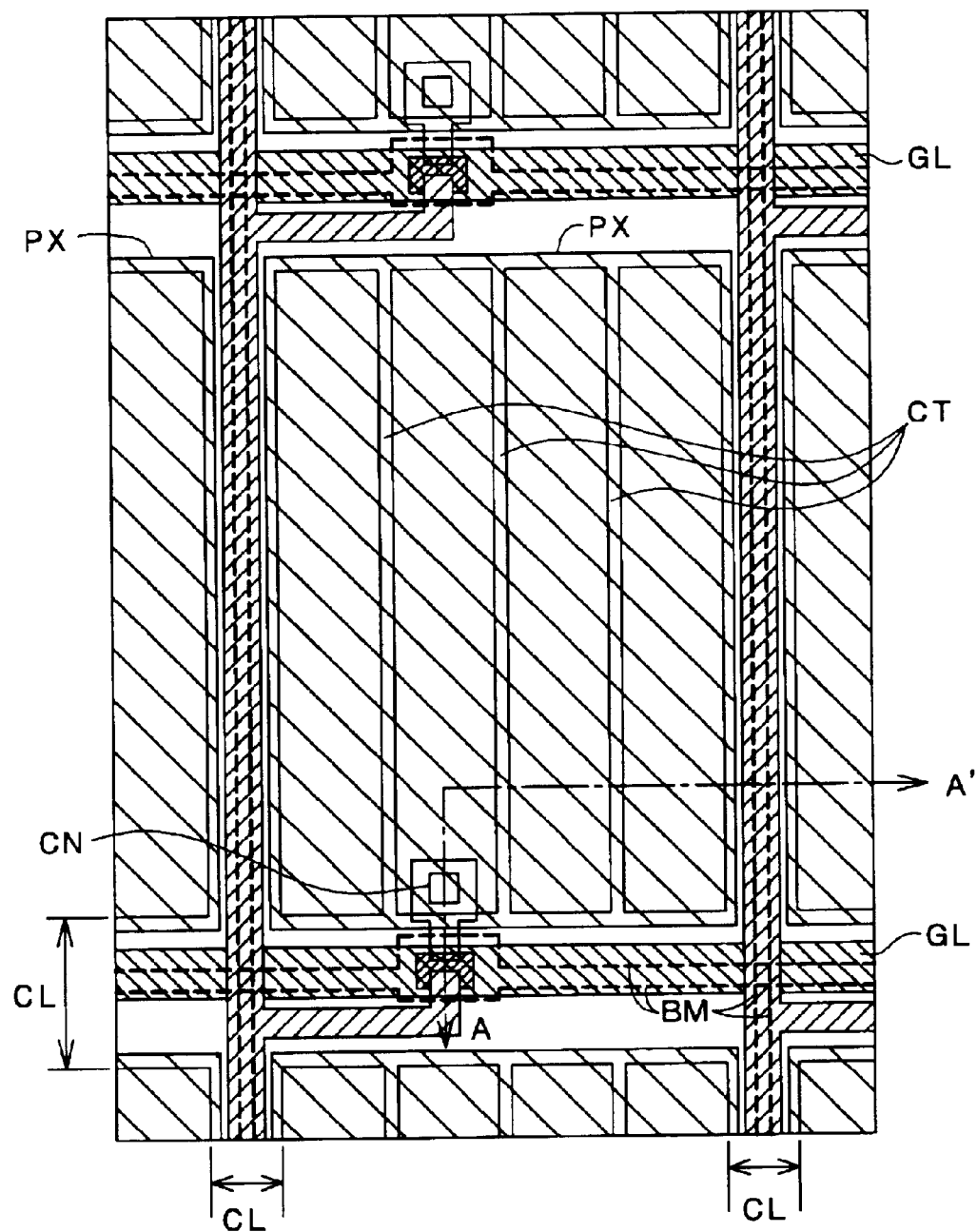
FIG. 2 is a plan view of a pixel of one embodiment of a liquid crystal display device according to the present invention.

FIG. 1 and FIG. 2 show a structure of a pixel portion of a liquid crystal display device of a type according to the embodiment 1. FIG. 1 is a cross section taken along a line A–A' of FIG. 2.

First of all, the embodiment is explained in conjunction with FIG. 1. Gate lines (gate electrodes) GL made of Mo, Cr or Al are arranged on a first substrate SUBI which uses a glass substrate and a gate insulation film GI made of SiN is formed such that the gate insulation film GI covers the gate lines GL. A scanning driving voltage is supplied to the gate lines GL. Further, A semiconductor film AS which is made of amorphous silicon is arranged on the gate lines GL by way of the gate insulation film GI and functions as a channel layer of a thin film transistor (TFT). Further, drain electrodes SD1 and the source electrodes SD2 made of Mo, Cr or Al are arranged on the semiconductor layer film AS by way of semiconductor layers d0 doped with phosphorus at high concentration. A protective film PSV made of SiN is formed such that the drain electrodes SD1 and the source electrodes SD2 are covered with the protective film PSV. The drain electrode SD1 substantially constitutes a portion of the drain lines DL to which a video signal voltage is applied. Then, a pixel electrode PX which is connected to the source electrode SD2 via a through hole CN formed in the protective film PSV and uses a transparent conductive film made of ITO or the like is arranged on the protective film PSV.

In this embodiment, a color filter layer FIL is formed on the pixel electrode PX. Here, in a plan view, the pixel electrode PX is formed in the inside of a region of one pixel, that is, the pixel electrode PX is formed in a rectangular shape in the inside of one pixel region which is partitioned by the neighboring drain lines and the neighboring gate lines. The color filter FIL is made of organic material and a planar pattern of the color filter FIL adopts a longitudinal stripe pattern. It is needless to say that the planar pattern is not limited to the stripe shape and may be formed in a rectangular shape or in a square shape particularly when the arrangement of pixels adopts a so-called delta arrangement.

As shown in FIG. 1, for example, the color patterns are partitioned on the drain line DL with respect to the green color filter layer FIL (G) and the red color filter layer FIL (R).

Further, light shielding films BM and common electrode lines CL and common electrodes CT are arranged on the color filter layers FIL. To observe the plan pattern shown in FIG. 2, the light shielding films BM are formed on the drain lines DL and gate line GL thus forming a structure which prevents incident light from the surface of the liquid crystal display device from being directly incident on the semiconductor layers AS. On the other hand, the common electrode lines CL are formed in a mesh pattern on the drain lines DL and the gate lines GL in the same manner. A width of the common electrode lines CL is wider than a width of the light shielding films BM and a pattern which superposes the common electrode lines CL on the lower pixel electrodes PX by way of the color filter layers FIL is adopted. Further, common electrodes CT form portions of the common electrode lines CL and define a comb-shaped portion in the pixel region. In this embodiment, the light shielding films BM are constituted of metal films made of Cr or Mo and the common electrode lines CL are constituted of transparent conductive films made of ITO or the like. An orientation film ORI is formed on the common electrodes CT and the color filters FIL disposed between the common electrodes CT and an orientation treatment is applied to a surface of the orientation film ORI.

Here, the forming of the light shielding layers BM using the metal films made of Cr or Mo and the common electrodes using the transparent conductive films and the provision of the laminated structure made of the light shielding layers, the common electrodes CT or common electrode lines CL above the drain lines DL in a spaced-apart manner by way of the color filters FIL bring about two advantages, that is, the enhancement of the contrast ratio due to the light shielding in the vicinity of the drain lines DL and the enhancement of numerical aperture due to the use of the transparent electrodes as the common electrodes CL. Since the common electrode lines CL on the video signal lines also function as the common electrodes CT, the manner of naming is not important. The transparent common electrodes CT having the width larger than that of the light shielding layers BM are laminated to the drain lines DL in FIG. 1. Accordingly, end portions of the common electrodes CT on the drain lines DL can be also utilized as light transmitting regions so that the numerical aperture can be further enhanced.

Further, the transparent electrodes are formed as layers above the light shielding layers. In this manner, with the use of the transparent conductive bodies made of oxide which exhibits high stability as layers above the light shielding layers, an advantageous effect that the metal-made light shielding layers below the transparent electrodes can be protected is obtained. In this case, the metal-made light shielding layers are formed as films. Thereafter, metal layers are firstly formed by performing coating, exposing, developing and etching. Then, transparent conductive layers are formed and, thereafter, coating, exposing, developing and etching are performed so as to allow the common electrodes in the pixel to be formed of only the transparent electrodes. It is needless to say that, as an opposite case, the metal-made light shielding layer is formed as the upper layer and the common electrode of the transparent electrode is formed as the lower layer. In this case, the metal layer and the transparent conductive layer are unitarily formed as films and then, the metal layer is subjected to photographing, exposing, developing and etching, and thereafter, the transparent conductive layer is subjected to photographing, exposing, developing and etching so as to form the common electrodes in the pixel which are formed of only the transparent electrodes thus forming the light transmission region whereby the continuous film forming of the metal layer and the transparent conductive layer becomes possible. Accordingly, an advantageous effect that the contact and the adherence between the metal layer and the transparent conductive layer are enhanced is obtained.

Further, the light shielding layers BM may be also formed on the gate lines GL in a matrix array. This is because that the quality of images can be enhanced by reducing the power supply resistance and the light shielding layer served for shielding light to the TFT becomes unnecessary at the opposing substrate side and hence, the numerical aperture can be enhanced.

Further, it is not always necessary to provide the color filters in the space between the drain lines DL and the light shielding layers BM to obtain the above-mentioned advantageous effects and organic insulation films or inorganic insulation films may be used in place of the color filters. From a viewpoint of the reduction of parasitic capacitance of the drain lines DL, it is desirable to use the organic insulation films which exhibit the low dielectric constant.

Further, even when the pixel electrodes PX are arranged in a comb shape as a so-called IPS arrangement and liquid molecules are driven in a so-called lateral electric field which has components parallel to a substrate between the pixel electrode PX and the common electrode CT, the above-mentioned advantageous effect can be obtained.

In the above-mentioned explanation, a case in which the light shielding layers constitute the upper layers, a case in which the organic insulation films are used in place of the color filters, a case in which the pixel electrodes PX are formed in a comb shape, a case in which the light shielding layers are formed on the gate lines GL, and combinations of these cases are not shown in the drawings intentionally. This is because that those who are skilled in the art can easily understand structural points to be changed when such cases are adopted in view of the above-mentioned explanation.

Further, the laminated structure made of the light shielding layers and the common electrode lines CL may be formed on only the gate lines GL. Such a constitution can also obtain an advantageous effect to reduce the power supply resistance which is brought about by forming the light shielding layers using the metal layers.

Particularly, in a normally black mode, the liquid crystal on the transparent electrodes are inoperable when they are at the same potential, that is, the display becomes a black display so that no large reduction of contrast is generated. Accordingly, even when only the transparent common electrodes CT or the common electrode lines CL are provided above the video signal lines DL, the practically constant image quality can be realized.

On the other hand, an orientation film ORI is also formed on the inner side of a second substrate SUB2 made of glass and a surface of the orientation film ORI is subjected to the rubbing treatment. Then, the first glass substrate SUB1 and the second glass substrate SUB2 have orientation-film-ORI-forming surfaces thereof arranged to face each other in an opposed manner and a liquid crystal layer LC is formed between these orientation-film-ORI-forming surfaces. Further, on outer surfaces of the first and second glass substrates SUB1, SUB2, polarizers POL are formed. Here, the first substrate SUB1 and the second substrate SUB2 are not limited to glass and may be formed of transparent substrates made of plastic or the like.

In the TFT liquid crystal display device which is constituted in the above-mentioned manner, when the electric field is not generated in the liquid crystal layer LC, the liquid crystal molecules in the liquid crystal layer LC adopts the homogeneous orientation which is the state in which the liquid crystal molecules are substantially parallel to the first glass substrate SUB1. However, this does not limit the initial orientation state. When a potential difference is applied between the common electrodes CT and the common electrode lines CL and the pixel electrodes PX formed on the first glass substrate SUB1, the electric field is generated. When the value of the generated electric field is equal to or more than the threshold-value electric field, the liquid crystal molecules are rotated so that the transmittivity is controlled. Lines of electric force which are applied to the liquid crystal layer start from the common electrodes CT, penetrate the liquid crystal layer LC and the color filter layers FIL and reach the pixel electrodes PX. In such a structure, the electric field includes electric field components in the lateral direction with respect to the substrates so that components of the liquid crystal molecules which are rotated with respect to the substrates become dominant whereby a liquid crystal display device having a wide viewing angle can be obtained.

Further, the comb-shaped common electrodes CT and the pixel electrodes PX in the pixel region are superposed while sandwiching the color filter layers FIL therebetween and the maximum electric field applied to the liquid crystal layer LC is determined by the thickness of the color filter layers FIL. The color filter layers FIL are formed of resin layers having a thickness of 1 to 2 $\mu$m. In this type, the maximum electric field between the pixel electrodes PX and the common electrodes CT is determined based on the planer size of the first glass substrate SUB1. Accordingly, the liquid crystal display device can reduce the driving voltage compared to the liquid crystal display device of the IPS type which is described in the Japanese Laid-open Patent Publication 111957/2000, for example. Further, in the above-mentioned publication, an additional transparent insulation film is formed on the pixel color filters and the pixel electrodes and the common electrodes are arranged such that these electrodes sandwich the transparent insulation film. Accordingly, this embodiment can simplify the steps by an amount corresponding to the forming of the transparent insulation films and the patterning of the films, and, at the same time, can reduce the number of alignment between the layers so that the numerical aperture can be enhanced whereby it becomes possible to provide the bright liquid crystal display.

Figure 3A:
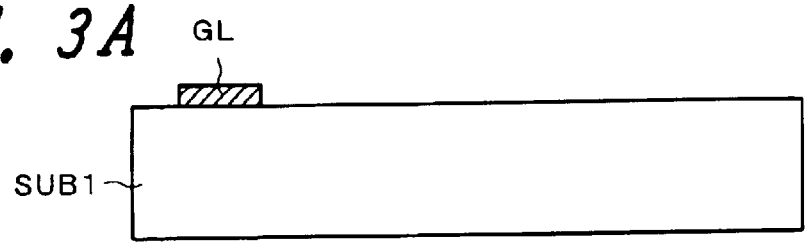
FIG. 3 is an explanatory view of a method for manufacturing one embodiment of a liquid crystal display device according to the present invention.

Then, an example of a method for manufacturing such a liquid crystal display device is explained. First of all, as shown in FIG. 3(a), a laminated film made of Cr, Mo or Al and Mo is formed and the gate lines GL are formed on the first glass substrate SUB1 by patterning this laminated film using photolithography and an etching technique.

Figure 3B:
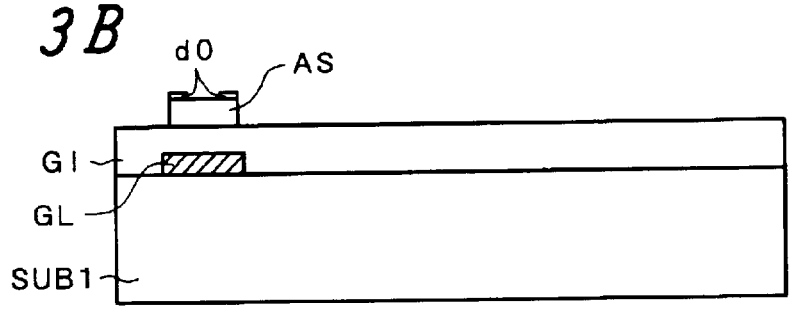

Subsequently, as shown in FIG. 3(b), the gate insulation films GI made of SiN are formed on the first glass substrate SUB1 including the gate lines GL, and the semiconductor films AS and the highly concentrated semiconductor films d0 made of amorphous silicon are formed on the gate lines GL by way of the gate insulation films GI. The semiconductor films AS and the n-type highly concentrated semiconductor films d0 doped with phosphorus are formed such that the gate insulation film GI, the semiconductor film AS and the highly concentrated semiconductor film d0 are continuously formed, and then, the highly concentrated semiconductor films d0 and the semiconductor films AS are formed by patterning using photolithography and an etching technique.

Figure 3C:
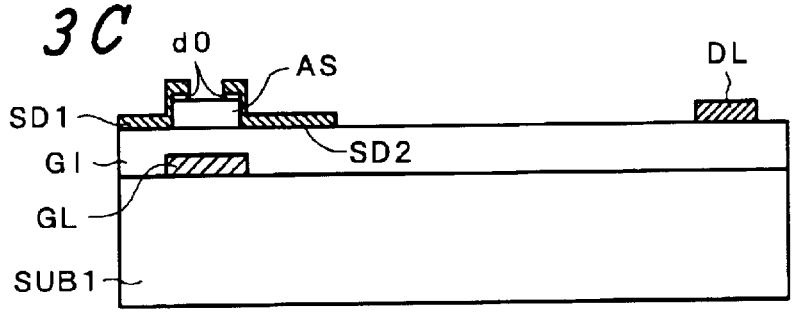

Then, as shown in FIG. 3(c), the drain electrodes SD1 and the source electrodes SD2 are formed such that these electrodes SD1, SD2 are partially superposed on the pattern of the highly concentrated semiconductor films d0. Thereafter, using the drain electrodes SD1 and the source electrodes SD2 as masks, the highly concentrated semiconductor layers d0 are removed by dry etching so as to form the channel regions of the TFTs. The drain lines DL are formed using same steps and same material as the drain electrodes SD1.

Figure 4A:
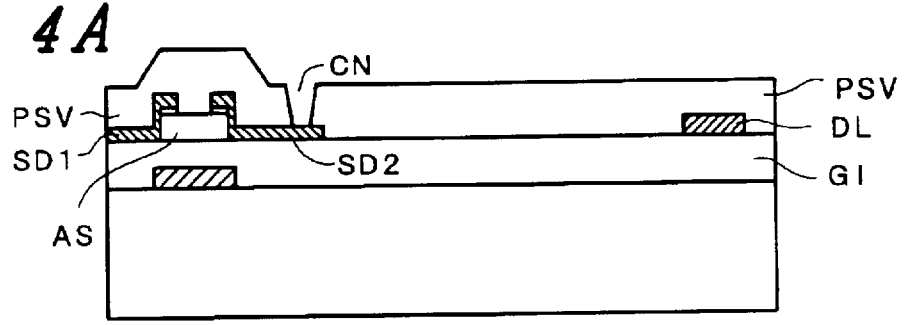
FIG. 4 is an explanatory view of a method for manufacturing one embodiment of a liquid crystal display device according to the present invention.
Figure 4B:
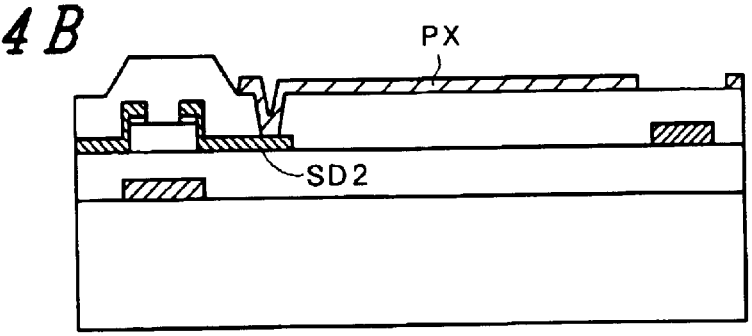

Then, as shown in FIG. 4(a), the protective film PSV is formed on the gate insulation film GI using SiN such that the protective film PSV covers the drain electrodes SD1, the source electrodes SD2, the semiconductor films AS and the drain lines DL. Subsequently, contact holes CN are formed in the protective film PSV above the source electrode SD2 using photolithography and etching. Thereafter, as shown in FIG. 4(b), the pixel electrodes PX which uses the transparent conductive film made of ITO are formed on the protective film PSV. These pixel electrodes PX have a substantially rectangular shape in a plan view and are connected to the source electrodes SD2 through the contact holes CN.

Figure 5A:
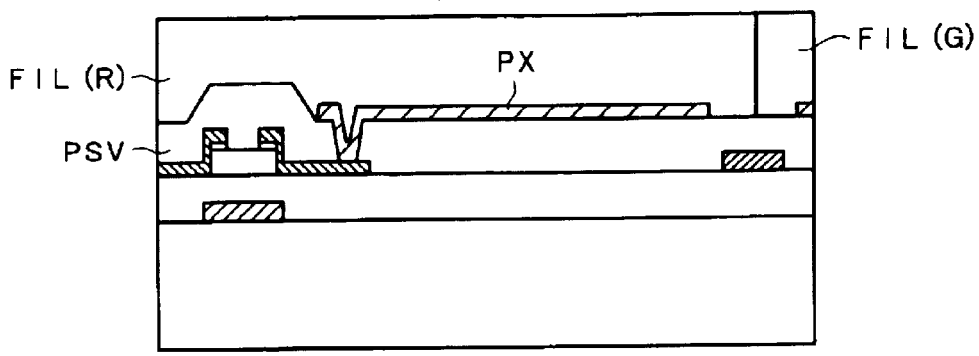
FIG. 5 is an explanatory view of a method for manufacturing one embodiment of a liquid crystal display device according to the present invention.

Then, as shown in FIG. 5(a), the color filter layers FIL are formed on the protective film PSV and the pixel electrodes PX. The color filter layers FIL are formed of, for example, resin films including dye or pigment of red (R), green (G) or blue (B), for example. To produce each resin film, for example, a pigment dispersed resist which is produced by dispersing pigment which is capable of obtaining desired optical characteristics such as red in photosensitive resin using acrylic resin as base material is used. First of all, the pigment dispersed resist is coated on the pixel electrodes PX and the protective film PSV. Thereafter, the pigment dispersed resist is subjected to exposing and developing using photo masks such that edges of the pattern are placed on the neighboring drain lines DL whereby the resin film is formed. These steps are repeated the number of times corresponding to the number of colors, for example, three times for three colors consisting of red (R), green (G) and blue (B) thus forming the color filter layers FIL.

Figure 5B:
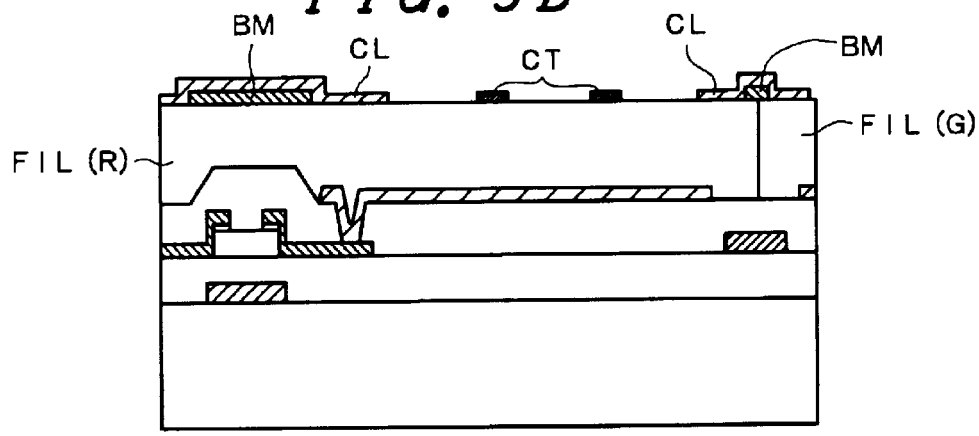

Then, as shown in FIG. 5(b), the light shielding films BM made of Cr or Mo are formed and, finally, the common electrode lines CL and the common electrodes CT are formed using the transparent conductive films made of ITO. The common electrode lines CL are formed such that the common electrode lines CL cover the drain lines DL by way of the color filter layers FIL. The common electrodes CT are formed in a comb shape and are superposed on the lower pixel electrodes PX by way of the color filter layers FIL.

The light shielding films BM are formed of metal films. This brings about an advantage that the common potential can be transmitted under the lower resistance through the light shielding films BM together with the common electrode lines CL. Further, the light shielding films BM may be formed of resin films. In this case, it is also possible to obtain an advantageous effect that the capacitance between the common electrode lines CL and the drain lines DL can be reduced. Further, depending on usage or applications, the light shielding films can be eliminated. In this case, it becomes possible to provide a liquid crystal display device which can simplify the manufacturing steps, can enhance the yield factor and can reduce the manufacturing cost. Particularly, when the semiconductor films AS are formed using polycrystal silicon, macro-crystal silicon or continuous grain silicon (CGS) in which grain boundaries of silicon polycrystal are arranged close to each other, the leak current which is generated between the drain electrodes SD1 and the source electrodes SD2 in the state TFTs are turned off by the irradiation of light can be reduced so that the light shielding films BM can be easily eliminated.

As mentioned above, in this embodiment, the lines of electric force which start from the common electrodes CT and the common electrode lines CL on the color filters FIL penetrate the liquid crystal layer LC shown in FIG. 1 and then penetrate the color filter layers FIL and reach the pixel electrodes PX below the color filter layers FIL. The liquid crystal molecules in the liquid crystal layer LC are rotated due to the electric field determined by these lines of electric force and hence, the transmittivity can be controlled. Further, in the pixel regions of this embodiment, as shown in FIG. 1 and FIG. 2, no through holes are formed in the color filter layers FIL. This makes the liquid crystal display device of this embodiment largely different from the IPS type liquid crystal display device disclosed in Japanese Laid-open Patent Publication 111957/2000 which arranges color filters on the first glass substrate SUB1. Due to such a constitution of the liquid crystal display device of the present invention, it becomes possible to fundamentally overcome the lowering of the yield factor due to the poor contact which occurs when a contact hole is formed in a resin-made color filter FIL of each pixel and the brightness irregularity which occurs in each pixel due to the difference of contact resistance among respective pixels. Accordingly, it becomes possible to realize the liquid crystal display device having a broad viewing angle which forms the pixel electrodes PX, the common electrodes CT and the color filter layers FIL on the first glass substrate SUB1 and also can exhibit the high yield factor and the high quality and can dissipate the brightness irregularities of respective pixels.

Although this embodiment has been explained with respect to the liquid crystal display device which uses the TFTs, this embodiment is applicable to a liquid crystal display device which uses MIMs.

Although this embodiment has been explained with respect to the constitution of the pixel portion of the liquid crystal display device, it is needless to say that various kinds of circuits such as a scanning signal driving circuit, a video signal driving circuit and a control circuit are mounted on a peripheral portion of the liquid crystal display device and the liquid crystal display device is driven by these circuits. Further, it is needless to say that a part of or a whole of these circuits may be formed of active elements which use polycrystal silicon, macro-crystal silicon or continuous grain silicon CGS in which grain boundaries of silicon polycrystal are arranged close to each other.

Further, the metallic material used for lines and electrodes may be Ta, W and the like besides material which have been explained heretofore in this embodiment.

Further, when the liquid crystal display device of this embodiment is constituted of a transmission type or a front-light type liquid crystal display device, it is needless to say that the device is provided with a backlight unit on a back surface of one of polarizers.

[Embodiment 2]

Figure 6:
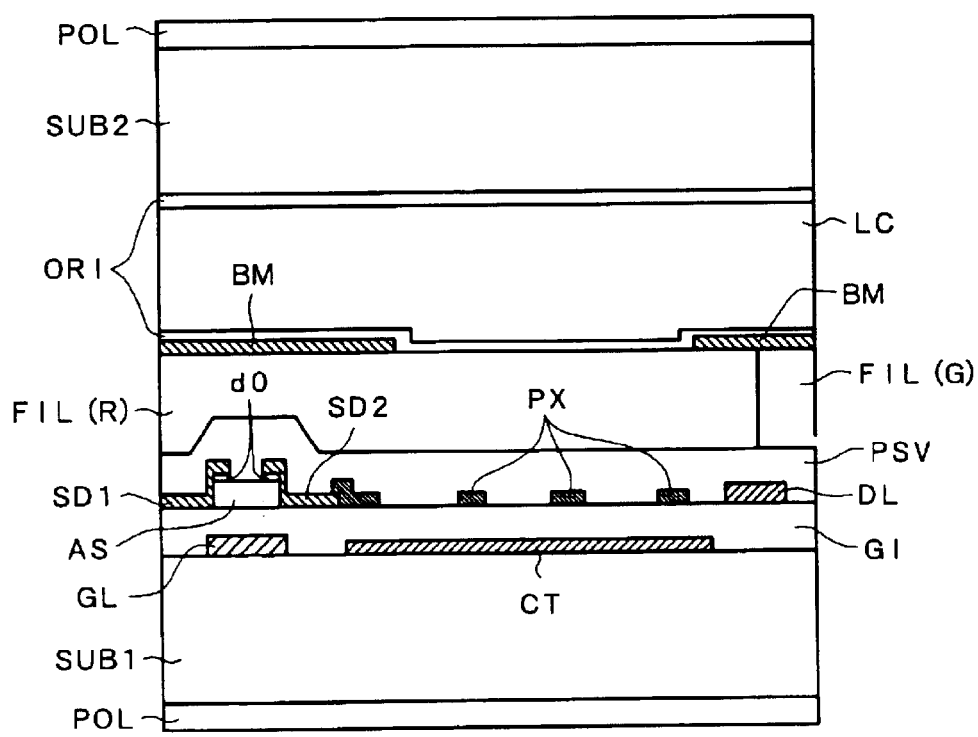
FIG. 6 is a cross-sectional view of a pixel of one embodiment of a liquid crystal display device according to the present invention.
Figure 7:
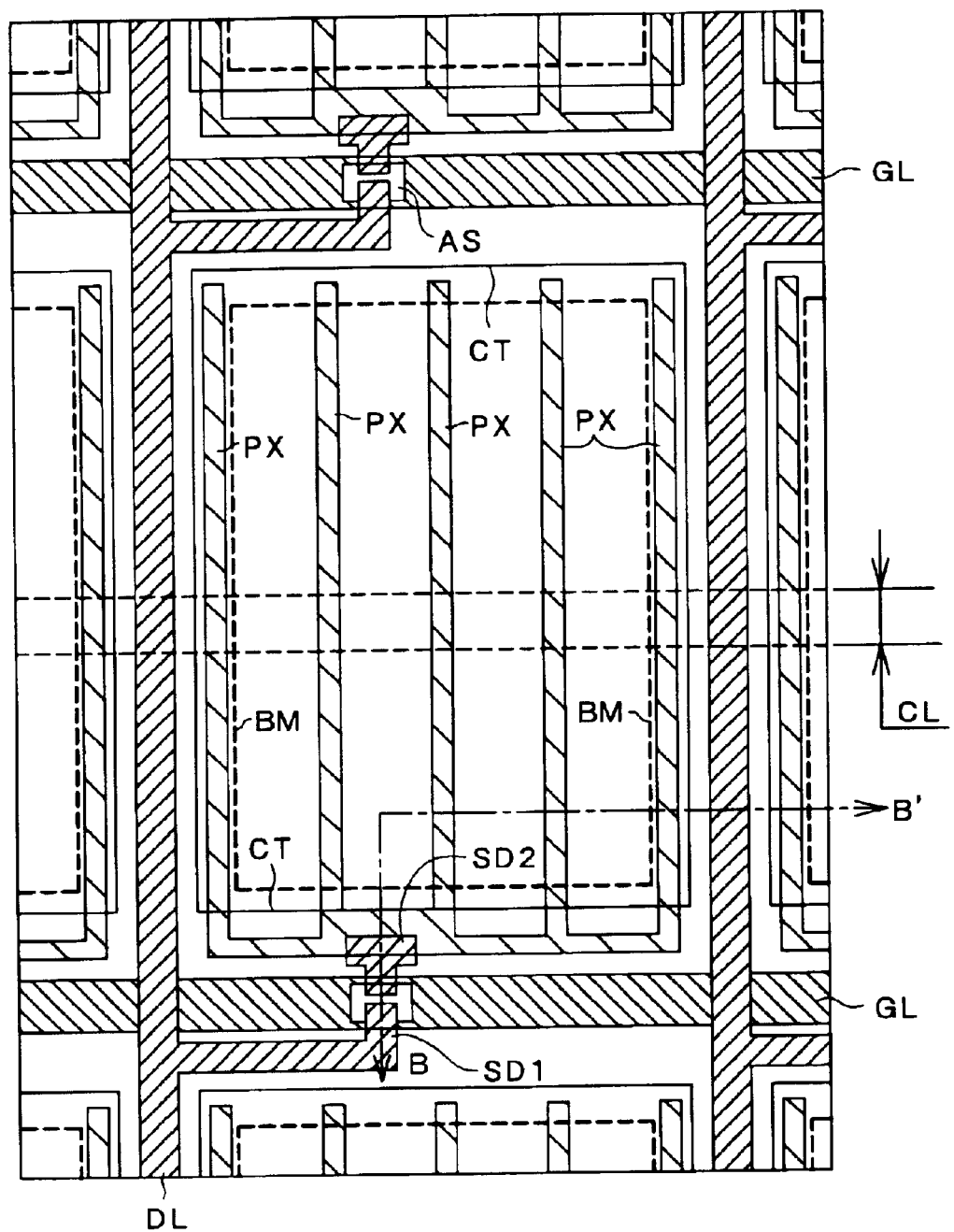
FIG. 7 is a plan view of a pixel of one embodiment of a liquid crystal display device according to the present invention.

The structural difference between this embodiment and the previous embodiment 1 is explained in conjunction with FIG. 6 and FIG. 7. Here, FIG. 6 shows a cross section taken along a line B–B' in FIG. 7.

In a liquid crystal display device of this embodiment, gate lines GL and common electrode lines CL are arranged on a first glass substrate SUB1 and, further, common electrodes CT which are formed of transparent conductive films made of ITO or the like are arranged to be superposed on and are connected with the common electrode lines CL as shown in FIG. 7. These common electrodes CT take a rectangular shape in a plan view such that the common electrodes CT are not superposed on the gate lines GL and drain lines DL. The first glass substrate SUB1 is covered with a gate insulation film GI such that the gate insulation film GI covers the electrodes and the lines. Semiconductor layers AS, drain electrodes SD1 and source electrodes SD2 are formed on the gate insulation film GI and the connection between the electrodes and semiconductor layers AS is established by n-type highly concentrated semiconductor layers d0 doped with phosphorus. The source electrodes SD2 and the drain electrodes SD1 are formed of the same metal films as those of the embodiment 1. The drain electrodes SD1 constitute portions of the drain lines DL.

Pixel electrodes PX which are connected with the source electrodes SD2 are formed of transparent conductive films made of ITO or the like and are formed in a comb shape in respective pixel regions. The pixel electrode PX having the comb shape is superposed on the common electrodes CT by way of the lower gate insulation film GI. Each pixel electrode PX may have a linear region and may have both ends thereof connected with each other. The pixel electrode PX is covered with a protective film PSV made of SiN. Color filters FIL are formed on the protective film PSV. Light shielding films BM which also function to shield light from being incident on TFT portions and function as a black matrix for peripheries of the drain lines DL are formed on the protective film PSV. An orientation film ORI is formed on the light shielding films BM. An orientation treatment is applied to the orientation film ORI in the same manner as the orientation film ORI formed on the inside of a second glass substrate SUB2.

As described above, in this embodiment, the lines of electric force which are extended from the pixel electrodes PX disposed below the protective film PSV penetrate the protective film PSV, the color filter layers FIL and the liquid crystal layer LC. Then, the lines of electric force are extended downwardly again and penetrate the color filter layers FIL, the protective film PSV and the gate insulation film GI exposed through gaps defined between the pixel electrodes PX and reach the common electrodes CT. Here, the dielectric anisotropy of the liquid crystal used here is not particularly specified. However, the material which has the positive dielectric anisotropy is preferable in the structure of this embodiment since the material can reduce the driving voltage.

In this embodiment, as in the case of the embodiment 1, a contact hole is not formed in the color filter FIL of each pixel which is formed of resin and hence, this embodiment exhibits the high yield factor compared with the conventional known example. Further, this embodiment has a great advantage that point defects can be reduced compared to the embodiment 1. The reason is explained as follows.

It has been well-known that the adhesion between organic material and inorganic material is more difficult than the adhesion between organic materials and the adhesion between inorganic materials. However, in the embodiment 1, it is necessary to form the common electrodes CT which are made of conductive metal or made of inorganic material such as transparent conductive material on the color filters FIL. Accordingly, the common electrodes are liable to be easily peeled off from the color filters FIL in the manufacturing steps thus providing the structure which easily generates point defects. Further, since the common electrodes CT are formed in a comb shape or in a linear shape, a width thereof is narrow. Accordingly, the common electrodes CT are liable to be more easily peeled off. When the structural elements above the color filters FIL are peeled off, assuming that the structural elements are electrodes, the control of light in these regions becomes impossible and even if the control of light per se is possible, the gap of the liquid crystal layer is fluctuated thus leading to the brightness irregularities.

To the contrary, in this embodiment, the light shielding layers are formed on the color filters FIL. These light shielding layers may be formed of resin as an example. In this case, since both of the light shielding layer BM and the color filters FIL are made of organic material, it becomes possible to provide the constitution which makes the peeling off of the light shielding layer BM and the color filters FIL from each other difficult. Further, when the light shielding layers BM are formed of metal material, because of the use of the light shielding layers BM, the layers BM can be made wider than that of the common electrodes CT of the embodiment 1 and hence, the contact area with the color filters FIL can be increased whereby the layer structure which is more difficult to be peeled off than that of the embodiment 1 can be realized. That is, according to this embodiment, irrespective of whether the light shielding layers BM are made of resin or metal, it becomes possible to make the constitutional layers on the color filters FIL more difficult to be peeled off compared to those of the embodiment 1 so that the yield factor can be enhanced.

[Embodiment 3]

Figure 8:
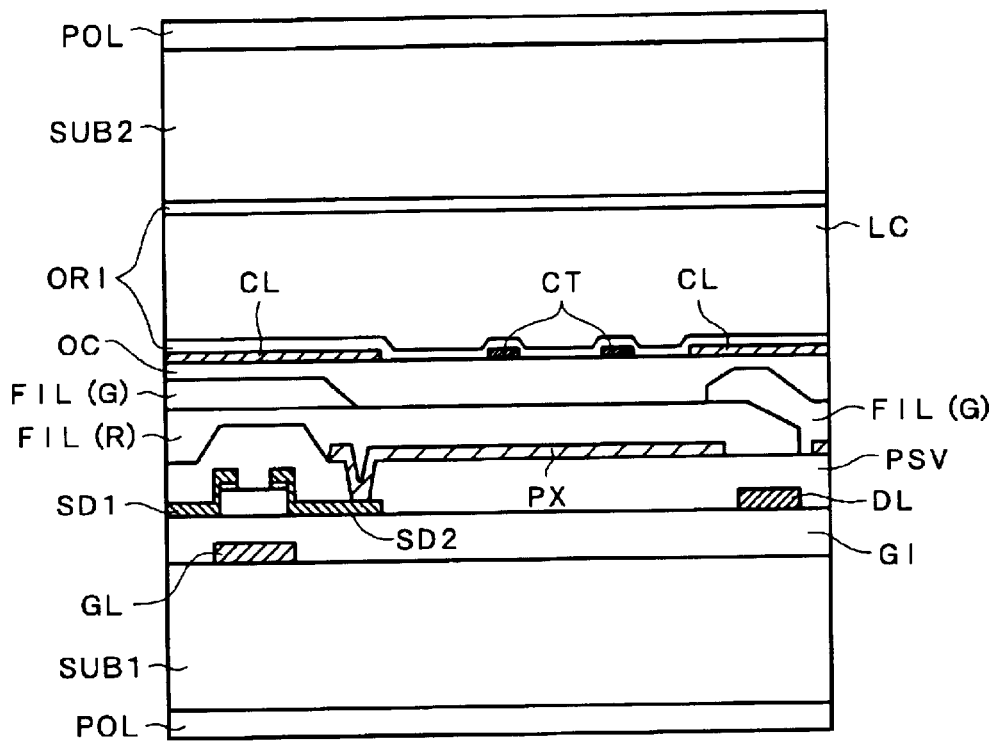
FIG. 8 is a cross-sectional view of a pixel of one embodiment of a liquid crystal display device according to the present invention.

FIG. 8 shows a cross section of a liquid crystal display device of this embodiment. On a first glass substrate SUB1, gate lines GL which drive a scanning voltage, drain lines DL which supply a video signal voltage, drain electrodes SD1 which constitute portions of the drain lines DL, source electrodes SD2, a gate insulation film GI which is made of SiN, a protective film PSV, and pixel electrodes PX which are arranged on the protective film PSV and are connected with the source electrodes SD2 are formed. The structure and the manufacturing steps up to the pixel electrodes PX of this embodiment are as same as those of the embodiment 1.

The difference between this embodiment and the embodiment 1 lies in the structure disposed above the pixel electrodes PX within the pixels and the manufacturing steps corresponding to the structure. The color filter layers FIL are arranged such that, at the semiconductor layer AS of the TFT, on the color filter layer FIL(R) of a single color, the color filter layer (G) of the neighboring pixel is superposed. In this manner, by superposing at least two or more color filter layers FIL, a light shielding effect against light incident from the second glass substrate SUB2 side can be enhanced. Although the color filter layers FIL are superposed in two layers in FIG. 6, by further superposing the color filter layer FIL (B) of another color, that is, blue, the light shielding effect can be further enhanced.

In this embodiment, at a portion of the pixel, by superposing the color layers formed of color filter layers FIL in two or three layers in a plan view, these color filters FIL are used as at least portions of the light shielding films of the TFTs or the black matrix for partitioning the pixels. Due to such a constitution, compared to the embodiment 1, the light shielding films BM which are formed by separate film forming or by separate patterning can be eliminated. That is, the color filter layers FIL are formed of, for example, resin films including dye or pigment of red (R), green (G) or blue (B), for example. To produce each resin film, for example, a pigment dispersed resist which is produced by dispersing pigment which is capable of obtaining desired optical characteristics such as red in photosensitive resin using acrylic resin as base material is used. First of all, the pigment dispersed resist is coated on the pixel electrodes PX and the protective film PSV. Thereafter, the pigment dispersed resist is subjected to exposing and developing using photo masks whereby the resin film is formed. These steps are repeated the number of times corresponding to the number of colors, for example, three times for three colors consisting of red (R), green (G) and blue (B) thus forming the color filter layers FIL.

In this embodiment, an overcoat layer OC which is made of transparent insulation film material is formed on the color filter layers FIL. This overcoat layer OC uses thermosetting resin such as acrylic resin, for example. Further, the overcoat layer OC may use photosetting transparent resin. Common electrode lines CL and common electrodes CT are formed on the overcoat layer OC. This overcoat layer OC has a flattening effect which can reduce defects which are generated in a rubbing step of an orientation film ORI due to stepped portions formed by partial superposition of the color filter layers FIL. Due to such a constitution, in a TFT liquid crystal display device of high definition which exhibits a small distance between neighboring drain lines DL and a small distance between neighboring gate lines GL, for example, in a TFT liquid crystal display device which sets the distance between the drain lines DL to not more than 80 μm, defects which are derived from the orientation treatment, particularly from the rubbing treatment could be reduced compared to the embodiment 1.

Further, in this embodiment, using an electric field whose intensity is determined by lines of electric force which start from the common electrodes CT and the common electrode lines CL on the color filters FIL and penetrate the liquid crystal layers LC, the color filter layers FIL and the overcoat layer OC and reach the lower pixel electrodes PX, liquid molecules in the liquid crystal layer LC are rotated so that the transmittivity can be controlled.

[Embodiment 4]

Figure 9:
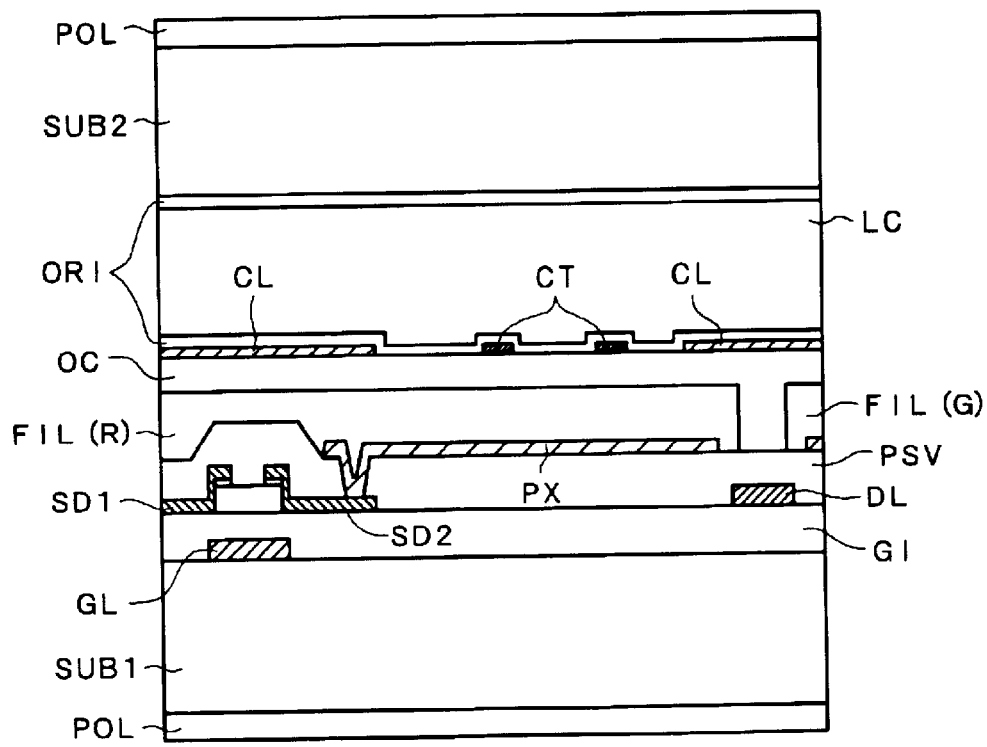
FIG. 9 is a cross-sectional view of a pixel of one embodiment of a liquid crystal display device according to the present invention.
Figure 10:
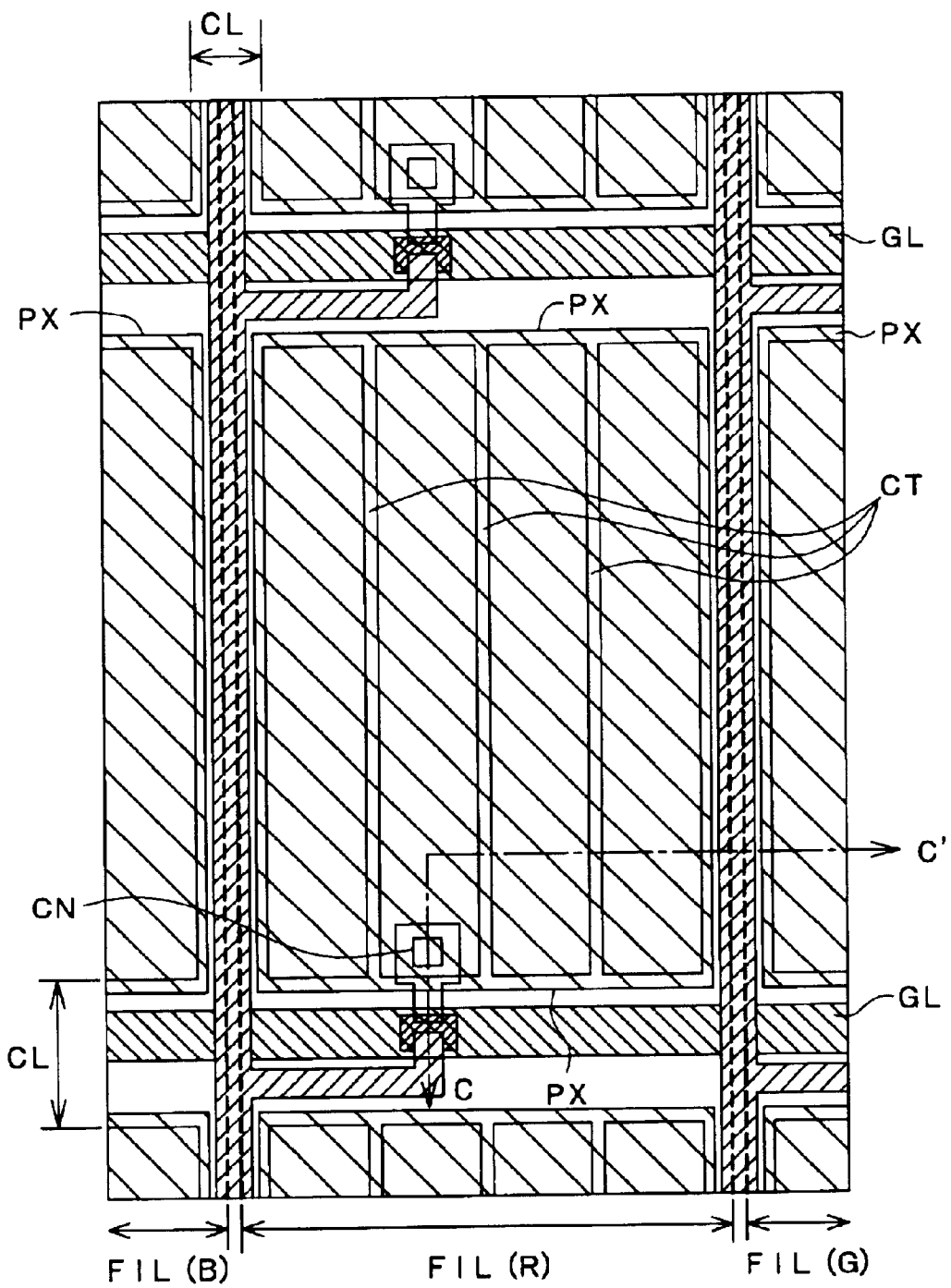
FIG. 10 is a plan view of a pixel of one embodiment of a liquid crystal display device according to the present invention.

FIG. 9 and FIG. 10 show a liquid crystal display device of a type according to an embodiment 4 of the present invention. FIG. 9 shows a cross section taken along a line C–C' in FIG. 10 which shows one pixel in a plan view. On a first glass substrate SUB1, gate lines GL which drive a scanning voltage, drain lines DL which supply a video signal voltage, drain electrodes SD1 which constitute portions of the drain lines DL, source electrodes SD2, a gate insulation film GI which is made of SiN, a protective film PSV, and pixel electrodes PX which are arranged on the protective film PSV and are connected with the source electrodes SD2 are formed. The structure and the manufacturing steps up to the pixel electrodes PX of this embodiment are as same as those of the embodiment 1.

Color filter layers FIL are formed on the protective film PSV. This embodiment is largely different from the embodiment 1 and the embodiment 2 in the planar pattern of the color filter layers FIL. Although the color filter layers FIL have boundaries in the vicinity of the neighboring drain lines DL, the neighboring color filter layers FIL have regions thereof which are separated from each other. That is, in the cross section shown in FIG. 9, the red color filter layer FIL(R) and green color filter layer FIL(G) have regions thereof which are neither superposed nor brought into contact with each other above and in the vicinity of the drain line DL.

On the other hand, a gap defined between the neighboring color filter layers FIL has a large stepped portion and hence, an overcoat layer OC which is made of transparent insulation film material is formed from above. The overcoat layer OC uses thermosetting resin such as acrylic resin, for example. Further, the overcoat layer OC may use the photosetting transparent resin. The overcoat layer OC has a flattening effect which can reduce the insufficient coating of the orientation film ORI and the insufficient orientation which are brought about by the partial superposition and the stepped portions.

Common electrodes CT and common electrode lines CL which drive a liquid crystal layer LC are arranged in a comb shape on the overcoat layer OC. The common electrodes CT are formed of transparent conductive films such as ITO. However, in the same manner as the embodiment 1 to the embodiment 3, both of the common electrodes CT and the common electrode lines CL may be formed of metal films which are made of Cr or Mo. In this case, although the transmittivity is lowered, the metal films exhibit the lower resistance than ITO and play a role of light shielding films and hence, it is unnecessary to provide light shielding films BM particularly and it becomes possible to provide a TFT type liquid crystal display device having a large screen.

The largest feature of this embodiment lies in a point that, as mentioned above, the color filter layers of each pixel are separated from each other such that they are not superposed each other along the neighboring drain lines DL or the color filter layers are separated pixel by pixel along the neighboring gate lines. This provision is made to realize the enhancement of the following performances. With respect to color resists which determine the colors of color filters, the high color purity and the high transmittivity have the trade-off relationship. As material which can make both of these factors in the trade-off relationship compatible, the inventors of the present invention have found that material having the electric conductivity is promising. The inventors also have found that material which contains ionic components is promising as another promising material.

However, when they are used in a trial basis in accordance with an actual product structure, unexpected new phenomena such as the worsening of crosstalks, the elevation of the driving voltage and the failure of reliability have taken place. Upon analyzing these in detail, it has been appreciated that the followings are causes of such phenomena. That is, it has been found that when the color filters FIL are made of these material and the color filter layers FIL disposed between the neighboring pixels are superposed each other, provided that the color filters FIL are made of highly conductive material, the potential of the pixel electrode PX leaks to the neighboring pixel and this causes the worsening of crosstalks and the lowering of effective voltage, that is, the elevation of the driving voltage. Further, it has been found that when the color filters FIL contain ionic components, the ion exchange is generated between the color filters FIL which are brought into contact with each other and the color fading phenomenon occurs with respect to the color filters FIL. It has been also found that this color fading phenomenon generates a problem on the reliability which becomes larger along with the lapse of time. Further, it has been found that when the color filter layers FIL contain the conductive ionic components, due to the actual driving of the liquid crystal display device, that is, due to the supply of electricity to the liquid crystal display device, the ion exchange is accelerated so that the fading of color rapidly occurs.

Accordingly, to enable the use of the color filters having conductivity, the color filters containing ionic components or the color filters having conductivity and containing ionic components, the inventors have invented or devised a structure shown in the cross-sectional view of FIG. 9 and the plan view of FIG. 10. That is, the color filters FIL are separated for respective pixels and the color filters FIL are separated from each other using transparent overcoat film OC. Further, the overcoat film OC is provided between the color filters FIL and the electrodes or conductive material such as the common electrodes CT which are formed on the color filters FIL.

In the former technique, when the color filters have the conductivity, the short-circuiting of the color filters between the pixels can be prevented and hence, it becomes possible to prevent the worsening of crosstalks and the elevation of the driving voltage. Further, when the color filters contain ionic components, the ion exchange between the color filters can be prevented so that the fading of the color filters can be prevented.

In the latter technique, when the color filters have the conductivity, the short-circuiting between the pixel electrode PX and the common electrode CT can be prevented. Further, when the color filters contain ionic components, it becomes possible to prevent a phenomenon that the ionic components in the color filters are dissolved into the liquid crystal layer thus contaminating the liquid crystal layer. At the same time, since the ion exchange between the liquid crystal layer and the color filter can be suppressed, the fading of color filters can be prevented.

Further, although the color filters FIL are not separated between the gate lines GL in FIG. 10 and the color filters FIL are not superposed along the drain lines DL, such a structure also can realize the above-mentioned advantageous effect to some extent. This is because that a width of the gate line GL is wider than a width of the drain line DL and hence, the distance between the neighboring pixel electrodes in the extending direction of the video signal lines can be held greater than the distance between the neighboring pixel electrodes in the extending direction of the scanning signal lines whereby the leaking between the pixel electrodes can be reduced. As shown in FIG. 9, a protective film is formed on the TFTs. This protective film also performs a function of preventing the short-circuiting between the source and drain of the color filter FIL.

Further, although this embodiment has been explained while focusing on the case in which the common electrodes CL and the pixel electrodes PX are formed on the same substrate, the advantageous effects of the present invention can be obtained by a case in which the common electrodes CL are formed on the substrate which faces the pixel electrodes PX in an opposed manner. Accordingly, this embodiment also includes such a case.

The color filters FIL may be separated between respective pixels in both of the scanning-signal-line extending direction and the video-signal-line extending direction. In this case, since the pixel electrodes between the neighboring pixels in the video-signal-line extending direction can be also completely separated from each other and hence, the advantageous effects of the present invention can be realized more reliably.

Further, when the color filter layers FIL has the conductivity, the potential of the pixel electrodes PX is transmitted to the front surface side of the color filters FIL due to the conductivity of the color filter layers FIL and hence, the potential of the pixel electrodes PX approaches closer to that of the liquid crystal layer LC side. Accordingly, a new advantageous effect that it becomes possible to provide a TFT type liquid crystal display device which can be driven with the low driving voltage is obtained. Further, when the resistivity which indicates the conductivity of the color filters is not more than $10^{14}$ $\Omega$cm, the voltage lowering effect can be obtained. To lower the driving voltage further, it is desirable that the resistivity is set to not more than $10^{10}$ Ωcm. It is needless to say that the lower becomes the resistivity, the driving voltage lowering effect can be more enhanced. However, when the resistivity is excessively lowered, the light transmittivity is liable to be lowered and hence, it is most preferable to set the resistivity within a scope of $10^3$ Ωcm to $10^{10}$ Ωcm.

Further, in the liquid crystal display device having the constitution of this embodiment, the driving electric field applied to the liquid crystal layer penetrates the color filter layers. With respect to a conventional method, for example, as an example of a method which mounts color filters on a substrate different from a substrate on which TFTs are mounted, there has been known a vertical electric field type in which pixel electrodes are formed on a TFT substrate, common electrodes are formed on color filters of a color filter substrate and a driving electric field is generated between the pixel electrodes and the common electrodes. In this type, the driving electric field which is applied to the liquid crystal layer does not penetrate the color filter layers. Further, in a so-called lateral electric field type, both of pixel electrodes and common electrodes are formed on a TFT substrate and the driving electric field is generated between these electrodes and hence, the driving electric field which is applied to the liquid crystal layer does not penetrate color filter layers. Further, with respect to a type which mounts color filters on a TFT substrate, in a known type, pixel electrodes are formed on the color filters and common electrodes are formed on a substrate which faces the TFT substrate in an opposed manner, and a driving electric field which is applied to a liquid crystal layer is formed between the pixel electrodes and the common electrodes. Accordingly, the driving electric field which is applied to the liquid crystal layer does not penetrate the color filters.

However, in this embodiment, the color filter layers are formed between the pixel electrodes and the common electrodes and the driving electric field is generated in the liquid crystal layer after penetrating the color filter layers. Accordingly, when the color filter layers contain ionic impurities as in the case of this embodiment, when the color filter layers has the conductivity, or the color filter layers contain some contaminating impurities such as metal ion or organic solvent or the like, as an example, the reaction between the liquid crystal layer and the color filter is accelerated due to the driving electric field which penetrates the color filters whereby there arises a new problem that the contamination of the liquid crystal layer is accelerated.

Accordingly, from a viewpoint of ensuring the reliability of the liquid crystal display device and of preventing the contamination of the liquid crystal layer, in the type which forms the color filter layers between the pixel electrodes and the common electrodes and in which the driving electric field is generated in the liquid crystal layer after penetrating the color filter layers, it is extremely desirable that the protective film for preventing the contamination is formed between the color filters and the liquid crystal layer. Further, it is preferable to use an organic film as the protective film since the organic film also can realize the flattening effect beside the contamination prevention effect.

As has been described in detail heretofore, due to the constitutions of respective embodiments, the TFT liquid crystal display device which mounts the color filters on the TFT substrate and can exhibit the high color purity and the high brightness can be realized.

Further, the present invention is not limited to the modes for carrying out the invention including the technical concept and advantageous effects which are described in respective embodiments 1 to 4, constitutions and advantageous effects brought about by the technical concepts disclosed in the specification including claims are all included in the category of the present invention.

[Advantageous Effects of the Present Invention]

Typical examples of the advantageous effects of the present invention are as follows.

That is, without forming the through hole in the color filter for each pixel, the present invention can provide the liquid crystal display device which arranges the pixel electrodes and the common electrodes for driving the liquid crystal layer on the first glass substrate and also incorporates the color filter layers therein.

Further, the present invention can provide the liquid crystal display device which can form not only TFTs but also CFs on the first substrate at the time of forming the liquid crystal display device having the wide viewing angle by rotating the liquid crystal molecules horizontally with respect to the substrates using a simplified manufacturing technique and the method for manufacturing such a liquid crystal display device.

Further, the present invention can provide the liquid crystal display device which exhibits the high numerical aperture and the high transmittivity and the method for manufacturing such a liquid crystal display device.

Still further, the present invention can provide the bright TFT display device which has the wide viewing angle.

What is claimed is:

1. A liquid crystal display device comprising first and second transparent substrates, and a liquid crystal layer sandwiched therebetween, wherein the first substrate includes a plurality of video signal lines, a plurality of scanning signal lines, and a plurality of pixel regions formed as being surrounded by respective neighboring video signal lines and scanning signal lines, and each of the pixel regions includes one active element and one pixel electrode, and a light shielding layer directly laminated all over by a common electrode, the common electrode being wider than the light shielding layer and arranged above a respective video signal line with an insulation film therebetween, the light shielding layer being made of metal, and the common electrode being made of a transparent conductive body.

2. A liquid crystal display device according to claim 1, wherein the common electrode is superposed on the light shielding layer which is above the video signal lines, and the common electrode is not superposed on the light shielding layer in display regions between the video signal lines.

3. A liquid crystal display device according to claim 1, wherein pixel electrodes in the pixel regions are formed in a comb shape.

4. A liquid crystal display device according to claim 1, wherein pixel electrodes in the pixel regions are formed in a comb shape and are formed below respective insulation films.

5. A liquid crystal display device according to claim 1, wherein the insulation film is formed of at least one color filter and positioned along the respective video signal line so as to define a boundary between any two neighboring color filters.

6. A liquid crystal display device according to claims 1, wherein the insulation film is formed of at least one organic film.

7. A liquid crystal display device according to claim 1, wherein light shielding layers are also formed on the scanning signal lines.

8. A liquid crystal display device according to claim 1, wherein the pixel electrode has a planar shape and the common electrode has a linear region.

* * * * *